US012653107B2

(12) United States Patent
Jongmans et al.

(10) Patent No.: US 12,653,107 B2
(45) Date of Patent: Jun. 16, 2026

(54) RASP BAR CONFIGURATION FOR AN AGRICULTURAL IMPLEMENT

(71) Applicant: CNH Industrial Belgium N.V., Zedelgem (BE)

(72) Inventors: Dré W.J. Jongmans, Klundert (BE); Bart M.A. Missotten, Herent (BE); Sam Reubens, Sint-Michiels (BE); Pieter Van Overschelde, Sint-Andries (BE); Bertl Verschaeve, Gits (BE)

(73) Assignee: CNH Industrial Belgium N.V. (BE)

( * ) Notice: Subject to any disclaimer, the term of this patent is extended or adjusted under 35 U.S.C. 154(b) by 509 days.

(21) Appl. No.: 18/115,506

(22) Filed: Feb. 28, 2023

(65) Prior Publication Data

US 2023/0276736 A1     Sep. 7, 2023

(30) Foreign Application Priority Data

Mar. 1, 2022     (EP) ...................................... 22159496

(51) Int. Cl.
| | |
|---|---|
| *A01F 12/18* | (2006.01) |
| *A01F 7/06* | (2006.01) |
| *A01F 12/22* | (2006.01) |

(52) U.S. Cl.
CPC ............ *A01F 12/181* (2013.01); *A01F 12/22* (2013.01); *A01F 7/06* (2013.01)

(58) Field of Classification Search
CPC ........... A01F 12/181; A01F 7/06; A01F 12/22

(Continued)

(56) References Cited

U.S. PATENT DOCUMENTS

| | | | | |
|---|---|---|---|---|
| 3,410,271 A | * | 11/1968 | Hengen | ................... A01F 12/22 |
| | | | | 460/122 |
| 3,817,256 A | | 6/1974 | Buchele et al. | |

(Continued)

FOREIGN PATENT DOCUMENTS

| | | |
|---|---|---|
| CN | 103960003 A | 8/2014 |
| CN | 203851515 U | 10/2014 |

(Continued)

OTHER PUBLICATIONS

Extended European Search Report for EP Application No. 22159496.3 dated Aug. 17, 2022 (20 pages).

(Continued)

*Primary Examiner* — Joseph M Rocca
*Assistant Examiner* — Sunny D Webb
(74) *Attorney, Agent, or Firm* — Buchanan Ingersoll & Rooney PC

(57)     ABSTRACT

A rotor for an agricultural implement such as a self-propelled harvester. The rotor includes a surface and one or more rasp bars which comprise a crop engaging portion that is immobile relative to the surface and a crop engaging portion that is movable relative to the surface, in that a distance between at least part of the movable portion and the surface of the rotor is variable. One of the crop engaging portions is a primary portion configured to engage with crop regardless of whether it is movable or not, while the other is a secondary portion that comprises a crop engaging feature such as a tooth for increasing traction on the crop. The crop engaging feature is activated, by either extending radially outwardly from the primary portion, or deactivated by lying at a same radial position or radially inwardly of the primary portion.

13 Claims, 5 Drawing Sheets

(58) Field of Classification Search
  USPC ........................................ 460/46, 71; 56/14.6
  See application file for complete search history.

(56) References Cited

U.S. PATENT DOCUMENTS

| | | | | |
|---|---|---|---|---|
| 3,964,492 | A | 6/1976 | Crego et al. | |
| 4,139,013 | A | 2/1979 | Hengen | |
| 7,749,054 | B2 * | 7/2010 | Farley ...................... | A01F 12/22 |
| | | | | 460/71 |
| 9,807,939 | B1 * | 11/2017 | Kile ........................ | A01F 12/20 |
| 2008/0167101 | A1 * | 7/2008 | Farley ..................... | A01F 12/22 |
| | | | | 460/72 |

FOREIGN PATENT DOCUMENTS

| | | | | | | |
|---|---|---|---|---|---|---|
| CN | 108781777 | A | * | 11/2018 | ............ | A01F 12/28 |
| CN | 108990558 | A | * | 12/2018 | ............ | A01F 11/06 |
| CN | 110558060 | A | | 12/2019 | | |
| CN | 111955172 | A | * | 11/2020 | ............ | A01F 12/20 |
| CN | 212544691 | U | * | 2/2021 | | |
| EP | 0028395 | A1 | * | 5/1981 | ............ | A01D 90/04 |
| EP | 0071697 | A2 | * | 2/1983 | ............ | A01F 12/18 |
| EP | 0216060 | A1 | * | 4/1987 | ............ | A01F 12/22 |
| EP | 3153009 | B1 | | 4/2017 | | |
| EP | 3669639 | A1 | | 6/2020 | | |
| SU | 1681763 | A1 | * | 10/1991 | | |

OTHER PUBLICATIONS

Office Action issued Jun. 5, 2025, by the National Intellectual Property Administration, P.R. China in corresponding Chinese Patent Application No. 202310187601.7 and an English translation of the Office Action and Search Report. (19 pages).

* cited by examiner

RASP BAR CONFIGURATION FOR AN AGRICULTURAL IMPLEMENT

FIELD OF THE INVENTION

The present invention relates to agricultural implements such as self-propelled harvesters for processing crops harvested from a field, and more specifically to threshing and/or separating systems for such implements.

BACKGROUND OF THE INVENTION

An agricultural harvester known as a "combine" is historically termed such because it combines multiple harvesting functions within a single harvesting unit, such as picking, threshing, separating and cleaning. A combine includes a header which removes the crop from a field, and a feeder housing which transports the crop matter into a threshing rotor.

More particularly, a rotary threshing and separating system includes one or more threshing and/or separation rotors which can extend axially (front to rear, also referred to as 'axial flow rotor') or transversely within the body of the combine, and which are partially or fully surrounded by a perforated concave. The crop material is threshed and separated by the rotation of the rotor or rotors relative to the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A plurality of rasp bars is mounted on the surface of the rotor. The rasp bars are designed for threshing and/or separating the crops between the rasp bars and the concave. Specific rasp bar designs have been developed for axial and transversal rotor configurations. In a harvester comprising an axially arranged rotor, crop material is carried across the surface of the rotor from the front of the rotor to the back. To move the crop material across a length of the rotor during rotation, the rasp bars are arranged in a spiral pattern to direct the crop material down the length of the rotor.

Rasp bars often have a convex crop engaging surface provided with a number of grooves oriented transversely at a non-perpendicular angle to the rotor's longitudinal direction. An axially arranged threshing and/or separation rotor comprises an upstream threshing section where the heaviest interaction with the crops takes place and a downstream separation section where the crop stream has thinned and where the crop interaction is less severe. However, in certain crop conditions or due to specific circumstances in terms of moisture conditions and/or the type of crops being harvested, the layer of the crops in the downstream area of the rotor may be more densely packed than average, and a higher traction on the crops in this area is desirable. In other circumstances, the interaction between the rasp bars and the crops may consume too much power because of a too aggressive impact of a number of rasp bars on the crops. In current configurations, the application of a higher or lower traction force exerted by the rasp bars on the crops, depending on circumstances, is not available.

SUMMARY OF THE INVENTION

In a first exemplary aspect, there is provided a rotor for an agricultural implement and an implement, such as a self-propelled harvester, comprising such a rotor. The function of the rotor is to process a layer of crops between the rotor and a concave of the implement, the concave being a rounded and perforated element mounted fully or partially around the rotor, as known in the art. The processing of the crops may include threshing of the crops and/or separation of grains and other smaller crop material from the larger crop material. The rotor may be an axial flow rotor configured to be mounted along the longitudinal direction of a self-propelled harvester, or a rotor configured to be mounted transversely to the harvester's longitudinal direction. The rotor comprises one or more rasp bars which comprise a crop engaging portion that is immobile relative to the rotor's surface and a crop engaging portion that is movable relative to said surface, in the sense that the distance between at least part of the movable portion and the rotor surface is variable. One of said crop engaging portions is a primary portion configured to engage with the crops regardless of whether it is movable or not, while the other is a secondary portion that comprises a crop engaging feature whose crop engaging function is fully or partially activated or fully deactivated as a function of the position of the movable portion, by either extending radially outward from the primary portion or by lying at the same radial position or radially inward of the primary portion. In the above, the expression 'extending radially outward from the primary portion' may cover a range of radial positions of the crop engaging feature relative to the primary portion. Within this range, the feature is extending outward to a higher or lesser degree as a function of the position of the movable portion. The wording 'fully or partially activated' refers to this distinction, i.e. the distinction between the feature fully extending outward from the primary portion, for example determined by a stop mechanism, and the feature partially extending outward, for example pushed inward from the maximum outward position by a dense mat of crops between the rotor and the concave.

One embodiment includes a rasp bar comprising as the primary portion a pivotable rasp bar body having a convex crop engaging surface, and wherein the secondary portion is immobile and comprises a crop engaging feature in the form of a tooth, a spike, a tine or the like, that extends outward radially from the rasp bar body, for example extending through a slit in the rasp bar body, when the latter is in a first angular position and that is at the same radial position or inward of the rasp bar body when the latter is in a second angular position.

The movable portion may be movable between extreme positions determined by a stop mechanism. The movable portion may be subjected to no forces other than the centrifugal force generated by the rotation of the rotor, in which case the movable portion may be actuated against said centrifugal force by a given crop layer density, so that the crop engaging feature of the secondary portion is activated in a self-regulating manner. According to other embodiments, the movable portion may be actuated actively by an actuating mechanism. According to still other embodiments, the movable portion is fixed during operation of the rotor, but it is adjustable by moving the movable portion and re-fixing it at another position.

The movable portion may be movable radially inward of the rotor surface.

The invention enables the adjustment of the crop engagement characteristics exhibited by a rasp bar as a function of crop conditions and/or conditions of the rotor as such. According to various embodiments, the adjustment may be done during operation of the threshing rotor, in a self-regulating or actively controlled manner, or between subsequent operational runs of the rotor. In this way, the invention represents a solution to the problems highlighted in the introduction.

DETAILED DESCRIPTION OF PREFERRED EMBODIMENTS OF THE INVENTION

Exemplary embodiments will now be described with reference to the drawings. The detailed description is not limiting the scope of the invention, which is defined only by the appended claims.

Figure 1:
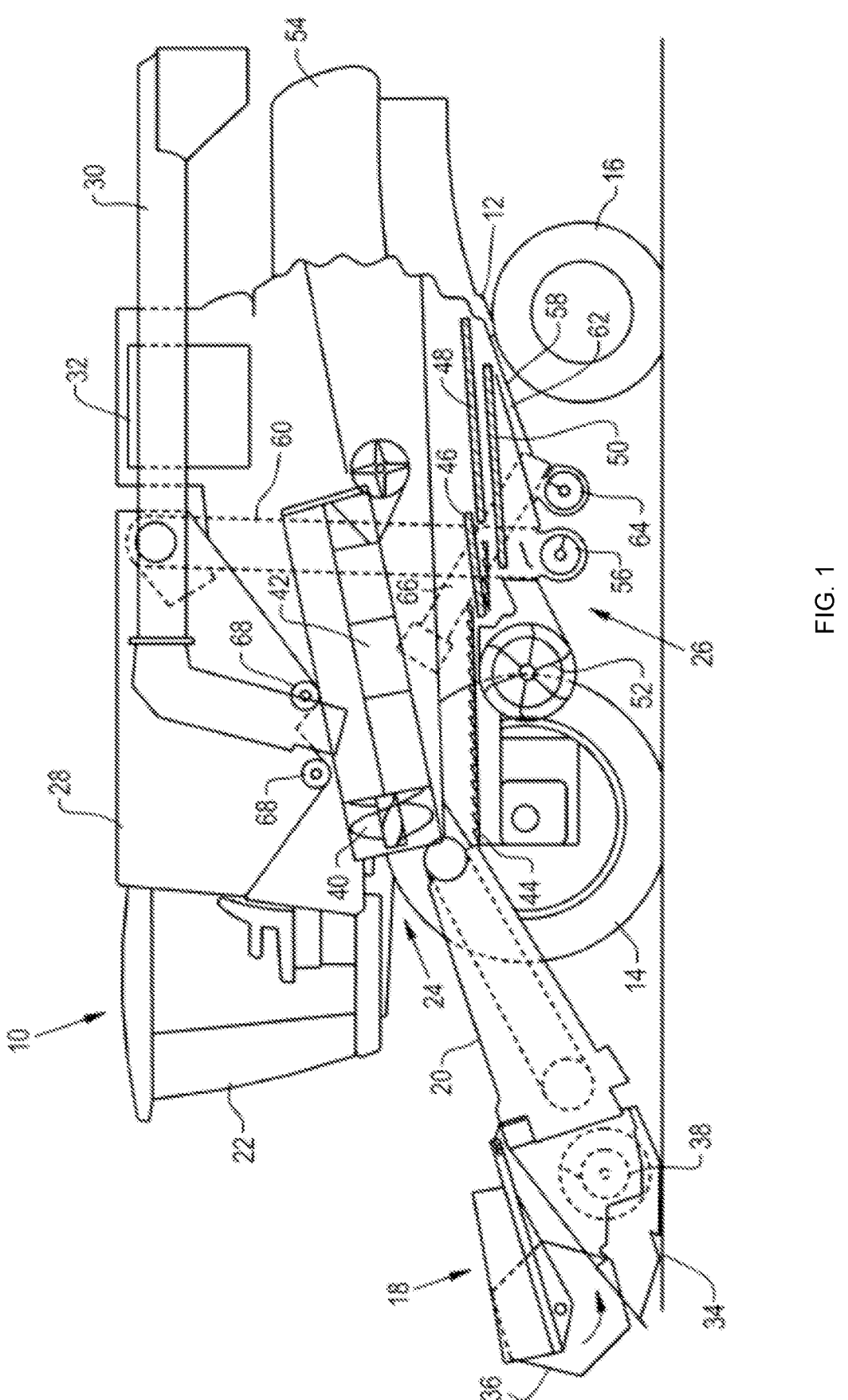
FIG. 1 illustrates a combine harvester and its principal components.

Referring to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyor 30.

The front wheels 14 are larger flotation type wheels, and the rear wheels 16 are smaller steerable wheels. Motive force is selectively applied to the front wheels 14 through a power source in the form of a diesel engine 32 and a transmission (not shown). Although the combine 10 is shown as including wheels, it is also to be understood that the combine 10 may include tracks, such as full tracks or half tracks.

A header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain which has been separated by the threshing and separating assembly 24 falls onto a grain pan 44 and is conveyed toward the cleaning system 26, which may include an optional pre-cleaning sieve 46, an upper sieve 48 (also known as a chaffer sieve), a lower sieve 50 (also known as a cleaning sieve), and a cleaning fan 52. Grain on the sieves

46, 48 and 50 is subjected to a cleaning action by the fan 52 which provides an airflow through the sieves to remove chaff and other impurities such as dust from the grain by making this material airborne for discharge from the straw hood 54. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via a tailings auger 64 and a return auger 66 to the upstream end of the cleaning system 26 for repeated cleaning action. Cross augers 68 at the bottom of grain tank 28 convey the clean grain within the grain tank 28 to an unloading auger 30 for discharge from the combine 10.

Figure 2:
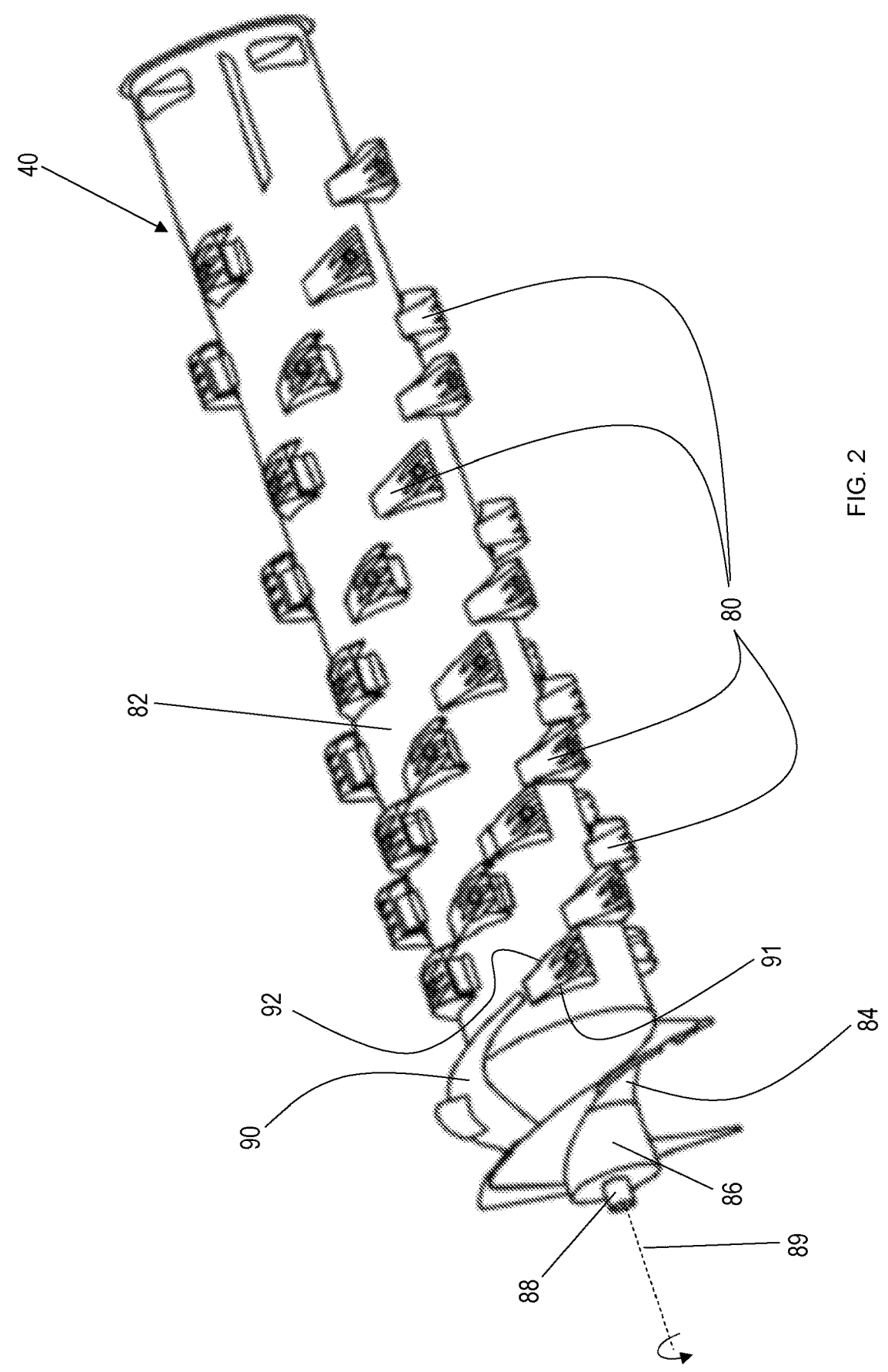
FIG. 2 illustrates a threshing and separation rotor configured for mounting in the axial direction of a combine harvester, comprising a rasp bar configuration as known in the prior art.

A typical axial-flow rotor 40 known in the art is shown in FIG. 2 with a plurality of rasp bars 80 connected to an outer surface 82 of the rotor 40. As can be seen, the rotor 40 can include a transition area 84 which gradually increases in diameter from a longitudinal end 86 of the rotor 40 to the outer surface 82 of the rotor 40 onto which the rasp bars 80 are mounted. As can be seen, the rotor 40 can be mounted on a bearing shaft 88 at the longitudinal end 86 of the rotor 40 to support the rotor 40 during rotation about its central rotation axis 89. A transition auger 90 can also be connected to the rotor 40 adjacent to the transition area 84, as is known. The direction of rotation of the rotor 40 about the central axis 89 is indicated by an arrow in FIG. 2.

As seen in FIG. 2, the rasp bars 80 are distributed in a spiral pattern and individual rasp bars 80 have a convex and grooved crop engaging surface, i.e. a surface that interacts with crops that are supplied to the space between the rotor 40 and the concave 42 (not shown in FIG. 2). The rasp bars 80 exert a threshing action on the crops in a first section of the rotor immediately downstream of the transition auger 90. As seen in the drawing, the rasp bars 80 are placed closer together in this threshing section as the density of the crop layer is higher and high-impact threshing interaction is required. More downstream is the separation section of the rotor 40 which has fewer rasp bars placed further apart, as the density of the crop layer has decreased and the primary function is to further separate grains and smaller chaff particles from the larger stalks which are guided towards the end of the rotor by the spiral pattern of the rasp bars 80. The rasp bars 80 have two sidewalls 91 and 92. The first sidewall 91 is oriented essentially perpendicularly to the rotor's central axis 89, while the second sidewall 92 is slanted relative to said central axis 89. The inclination angle of the slanted sidewalls 92 is designed for guiding the crops along a spiral path from the inlet section of the rotor 40 towards the outlet section. In the prior art configuration shown in FIG. 2, the rasp bars 80 are fixed to the rotor surface 82, usually by a bolt connection.

Figure 3:
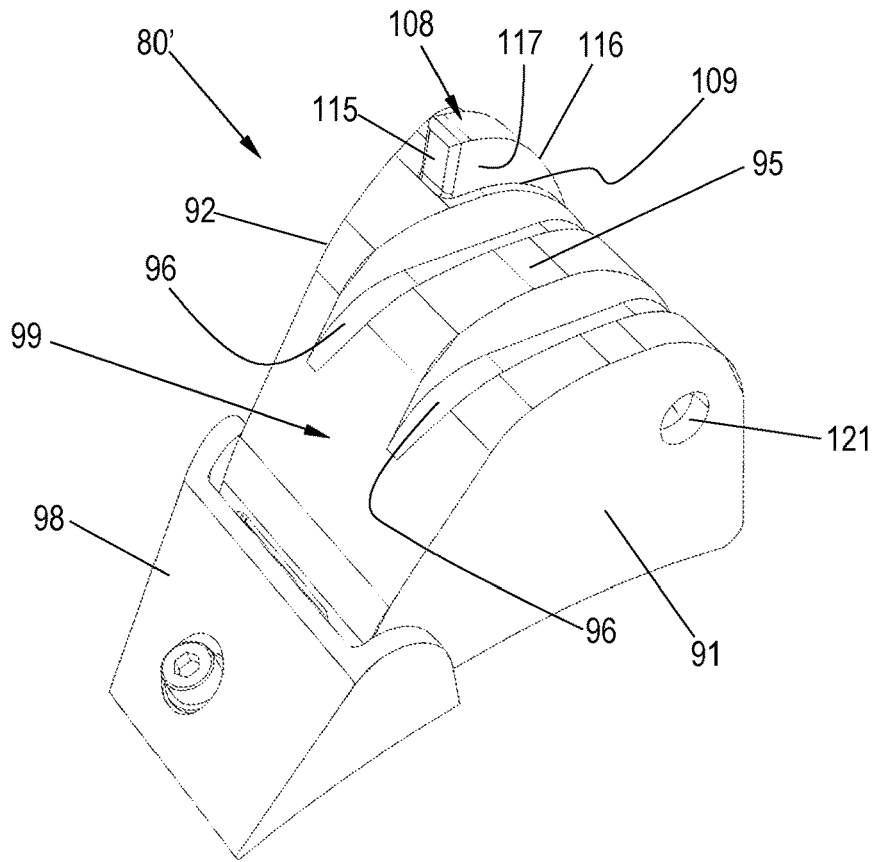
FIGS. 3 and 4 illustrate a rasp bar in accordance with an embodiment of the invention, comprising a pivotable rasp bar body positioned in a first position.
Figure 4:
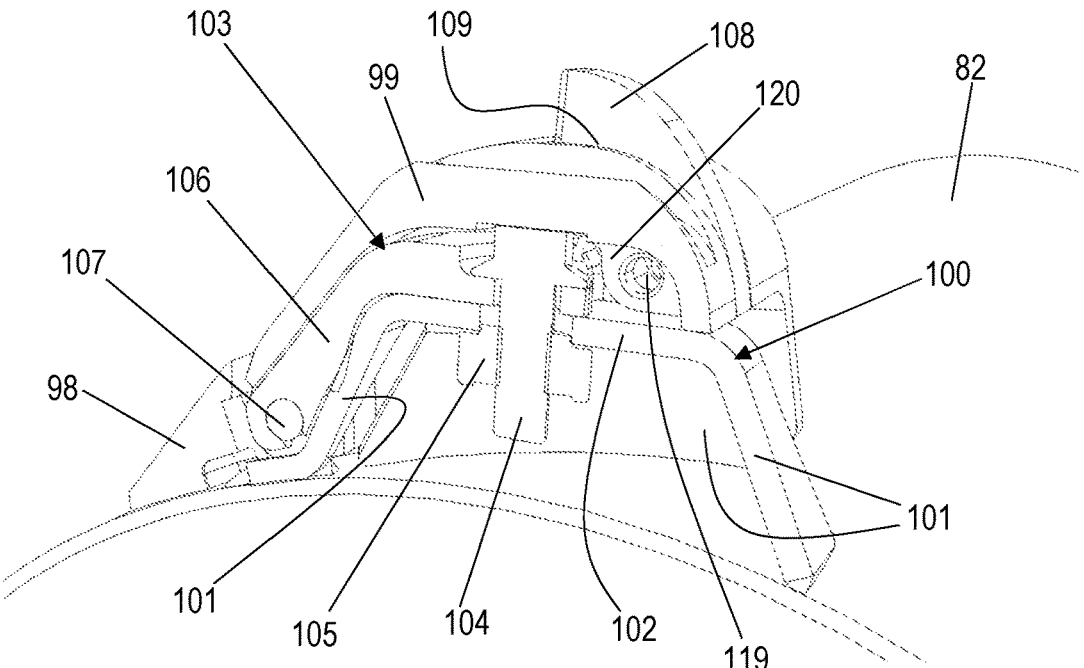

FIGS. 3 and 4 show a rasp bar 80' in accordance with an embodiment of the present invention. The convex surface 95 provided with two essentially parallel grooves 96 is similar to the prior art rasp bars, except for the orientation of the grooves which is now perpendicular to the rotor's central axis (this orientation is however not a limiting feature of the invention as will be explained in more detail later). The first sidewall 91 that is perpendicular to the rotor's central axis and the slanted sidewall 92 are also similar to the prior art rasp bars. In this case however, the rasp bar body 99, i.e. the rasp bar portion having the convex and grooved surface 95 and the two sidewalls 91 and 92, is mounted pivotably with respect to the rotor's outer surface 82.

As seen in the section view in FIG. 4, the rasp bar 80' is realised as an assembly of different components which will be described in more detail hereafter. A table-like support 100 having slanted sidewalls 101 and a level upper portion 102 is welded to the rotor surface 82. This support may be similar to supports used for existing rasp bars, which are immovably attached to these supports by a bolt connection through the level upper portion 102 of the support. The shape of the support 100 may nevertheless differ from what is shown in the drawing, as long as the function of the support, as described hereafter, is fulfilled.

In the embodiment shown, a non-pivotable crop engaging portion 103 is bolted to the level upper portion 102 of the support 100, by a bolt 104 that is screwed into a nut 105 that may be integral with the support 100. The non-pivotable portion 103 furthermore comprises a slanted front part 106 that lies against one of the slanted walls 101 of the support 100. An additional bolt connection (not shown) may be present through this slanted wall 101 and through the front part 106.

In the vicinity of the base of the slanted wall 101, the slanted front part 106 comprises an opening with a pin 107 inserted in said opening. The pin 107 is oriented essentially parallel to the rotor's longitudinal direction. The rasp bar body 99 is pivotably coupled to this pin 107 by suitable pivot connections on either side of the pin 107, so that the rasp bar body 99 is pivotable about a pivot axis that is essentially parallel to the rotor's central axis 89. The pivoting motion enables an upward or downward movement of the rasp bar body 99 relative to the rotor surface 82, i.e. the rasp bar body 99 is either closer to or further from the rotor surface 82 depending on its angular position about the pivot pin 107.

In the embodiment shown, a protective cover bracket 98 is bolted to the rotor surface 82 and covers the front ends of the non-pivotable portion 103 and of the pivotable rasp body 99 in the vicinity of the pivot pin 107. The cover bracket 98 thereby protects the pivot pin 107 from dirt and crop particles which might otherwise obstruct the pivoting movement, and extends the crop engaging front slope of the rasp bar body 99 up to the rotor surface 82. Such a cover bracket 98 is however an optional feature of the present invention.

Figure 5:
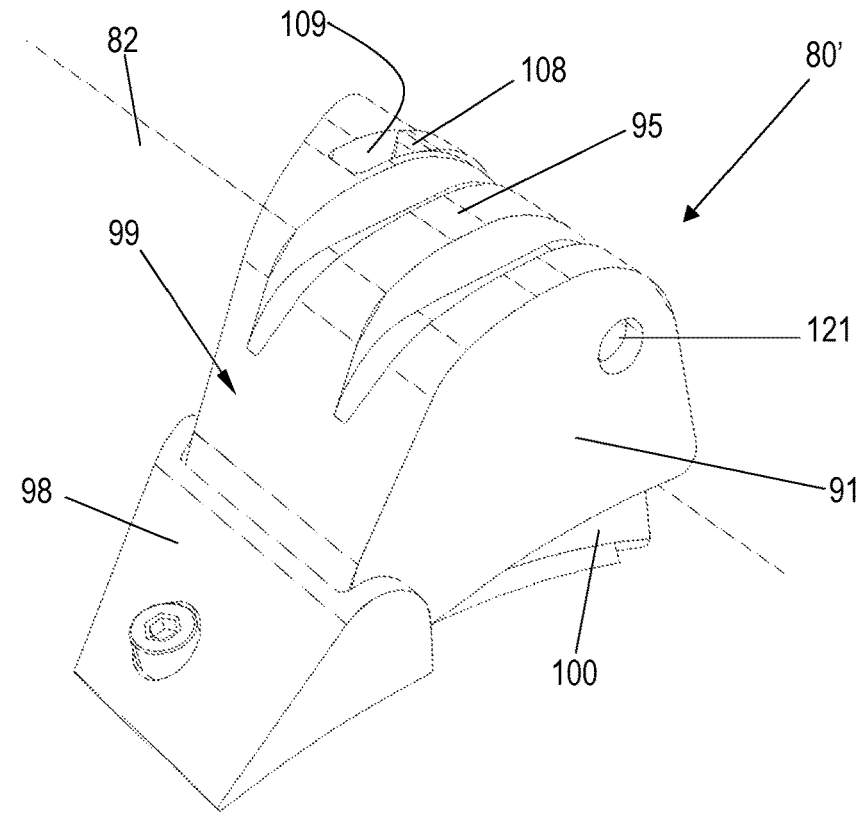
FIGS. 5 and 6 illustrate the rasp bar of FIGS. 3 and 4, with the rasp bar body positioned in a second position.
Figure 6:
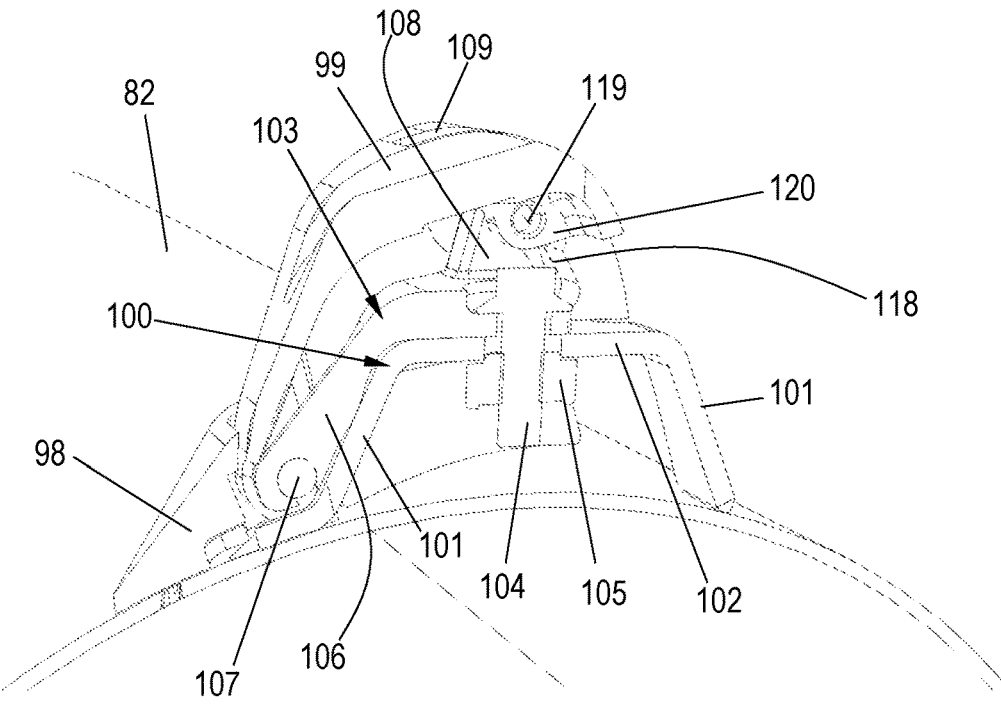

The non-pivotable portion 103 further comprises a tooth 108 that fits into a slit 109 provided in the rasp bar body 99 so that the tooth 108 protrudes radially (as seen from the central rotation axis 89 of the rotor) outward from the convex surface 95 of the rasp bar body 99, when the latter is in the position shown in FIGS. 3 and 4. However, when the rasp bar body 99 is pivoted upwards, as illustrated in FIGS. 5 and 6, it is seen that the tooth 108 no longer protrudes outward from the rasp bar body 99. In this particular embodiment, the tooth has a planar front wall 115, a curved back wall 116 and parallel sidewalls 117 that fit between the parallel walls of the slit 109. The front wall 115 of the tooth 108 is a crop-engaging surface, configured to increase the traction force exhibited by the rasp bar 80' as a whole when the rasp bar body 99 is in the fully downward position shown in FIGS. 3 and 4. The traction force exerted by the tooth 108 decreases when the rasp bar body 99 pivots upward relative to the tooth 108.

When the rasp bar body 99 is in the maximum upward position shown in FIGS. and 6, the tip of the tooth 108 is essentially at the same radial position as the crop engaging surface 95 of the rasp bar body 99, and the crop engaging function of the tooth 108 is thereby fully deactivated.

In the embodiment illustrated in FIGS. 3 to 6, the assembly of the support 100 and the non-pivotable portion 103 forms the 'immobile crop engaging portion' of the rasp bar, referred to in the appended claims. The constructional details of the illustrated embodiment are however not limiting the scope of the invention. In an alternative embodiment, the immobile crop engaging portion may be a single piece welded to the rotor surface, the piece being shaped similarly to the assembly of the portions 100 and 103 of the embodiment shown in the drawings. In the embodiment shown, a stop mechanism limits the angular displacement of the rasp bar body 99 to the range between the extremes shown in the drawings. As best seen in FIG. 6, this mechanism comprises a curved groove 118 provided in the sidewall of the tooth 108, and configured to receive therein a sliding pin (not shown) that is to be inserted through an opening 119 provided through an internal lip 120 of the rasp bar body 99. A matching opening 121 is provided in one sidewall 91 the rasp bar body 99 for enabling the insertion of the sliding pin. Opening 119 is preferably threaded to enable fixing the sliding pin. The stop mechanism thereby limits the angular displacement of the rasp bar body 99 to the range between the positions shown respectively in FIGS. 3 and 5. The invention is however not limited to the particular stop mechanism illustrated in the drawings. In another embodiment, the rasp bar body 99 may also be moved radially inward of the rotor surface.

The pivoting movement of the rasp bar body 99 may be actuated in different ways, in accordance with different embodiments of the invention. In the embodiment shown, no active actuation means are present so that the rasp bar body 99 is pivoted upwards by the centrifugal force generated by the rotation of the rotor 40 about its central axis 89. When no significant counterforce is applied to the rasp bar body 99, the latter is then maintained in its maximum upward position by the stop mechanism, i.e. the tooth 108 is not protruding outward from the rasp bar body 99 and is thereby deactivated. Only a significantly high counterforce exerted by the crops advancing between the rotor 40 and the concave 42 is capable of pushing the rasp bar body 99 down against the centrifugal force so that the crop engaging function of the tooth 108 may be activated in a self-regulating manner. Although rasp bars according to the invention may be placed anywhere on the rotor surface, it is particularly advantageous to place such self-regulating pivotable rasp bars 80' in the separation area of an axial flow rotor 40, i.e. in a downstream portion of the rotor. In this area, increased traction on the crops is only required when the layer of advancing crops is more densely packed than normal. The thickness of the crop layer is limited by the spacing between the rotor surface and the concave, but the density of the crops increases as a function of the amount of crops pressed into said spacing. When such increased crop density occurs above a given level, the mat of crops is able to push the rasp bar body down against the centrifugal force, thereby activating the tooth 108 and the required increased traction.

According to other embodiments of the invention, additional forces are applied to the rasp bar body 99, to either actively actuate the pivoting movement or to influence the threshold at which the crops are able to push the rasp bar body 99 downward against the centrifugal force. The latter may be realised by mounting a spring between the non-pivoting portion 103 of the rasp bar and the rasp bar body 99. The spring may for example be configured to pull the rasp bar body 99 towards its downward position when the rotor 40 is not rotating. In other words, the centrifugal force works against the spring force. The spring may be designed so that the centrifugal force is still pulling the rasp bar against the spring force towards its maximum upward position when the crop density is normal or low. However, the required counterforce exerted by the crops for activating the tooth 108 is smaller compared to the case without the spring. This enables designing the rasp bar so that the tooth is activated at a particular crop density. Different spring tensions could be applied at different locations along the rotor, or springs could be replaced to adapt the rotor to specific crop types or conditions. The spring could be a mechanical spring or a hydraulic spring or any other suitable resilient means having the desired spring effect.

According to other embodiments, the pivoting movement of the rasp bar body 99 is actively controlled by an actuating mechanism. This could for example include electrical, hydraulic or pneumatic actuators mounted inside the rotor 40 and operatively coupled to the pivotable rasp bar bodies 99 of a number of rasp bars 80'. The actuating mechanism is configured to move the pivotable rasp bar bodies 99 and to maintain them in a desired position. The active control enables the activation or de-activation of the tooth 108 depending on circumstances such as crop type, density of the crops or other crop conditions. The position of the rasp bar bodies 99 may be manually controlled by the operator of the harvester, through a user interface in the operator's cabin that allows setting the position of the rasp bar bodies 99 at a desired value, or automatically on the basis of a control algorithm executed by an electronic control unit that receives input from a number of sensors, for example one or more moisture sensors measuring the humidity of the crops or load sensors measuring the load exerted on the rotor's rotation axis 89 or on the surface 82 of the rotor 40.

The invention is therefore related also to a method for controlling the position of the movable portion of the rasp bar on a rotor according to embodiments of the invention in accordance with the preceding paragraph, i.e. a rotor comprising one or more rasp bars having an immobile portion and an actively controllable movable portion. In general terms, the method includes detecting or measuring an operational condition of the crops that are being processed using a rotor in accordance with said embodiments, and/or an operational condition of the rotor as such. On the basis of the detected or measured condition, an optimal position of one or more of the movable and actively controllable rasp bar portions is determined, and this optimal position is set by the actuating mechanism coupled to the movable portion(s). These actions can be taken by providing a suitably programmed control unit capable of receiving input signal from one or more sensors and of sending control signals to the actuators configured to set the position of the movable rasp bar portions. Any suitable operational parameter can be used as input for the method. According to preferred embodiments, the parameter may be one or more of the following: moisture of the crops measured by one or more moisture sensors known in the art, grain loss measured by a grain loss sensor as known in the art (i.e. a sensor that measures the amount of grains that the rotor fails to separate from the harvested crops), the power consumption related to driving the rotor, measured for example via one or more load sensors on the rotor or the rotor axle.

The invention is not limited to the embodiment shown in the drawings in terms of the appearance and function of the movable crop engaging portion and the immobile crop engaging portion of the rasp bar. For example according to an embodiment, the rasp bar body 99 and the tooth 108 have a similar appearance as shown in the drawings, but now the rasp bar body 99 is non-pivotable while the portion 103 comprising the tooth 108 is pivotable relative to the non-pivotable rasp bar body 99, either freely between stop positions, or with a spring mounted between the two, or with a mechanism for actively positioning the tooth-portion 103 in a desired position. In such an embodiment, it may be advantageous to provide a rasp bar body 99 that is fixed to the support 100 in the position shown in FIG. 3, and a pivotable tooth 108 that is either hidden underneath or flush with the rasp bar body 99, or pivoted upwards through a slit in the rasp bar body 99 so as to protrude outward from the convex surface 95 of the rasp bar body, and thereby become enabled to engage with the crops. In such an embodiment it is preferable to provide active actuation of the pivotable tooth 108 so that it may be pushed outward when the density of the crops is higher than average.

Figure 7:
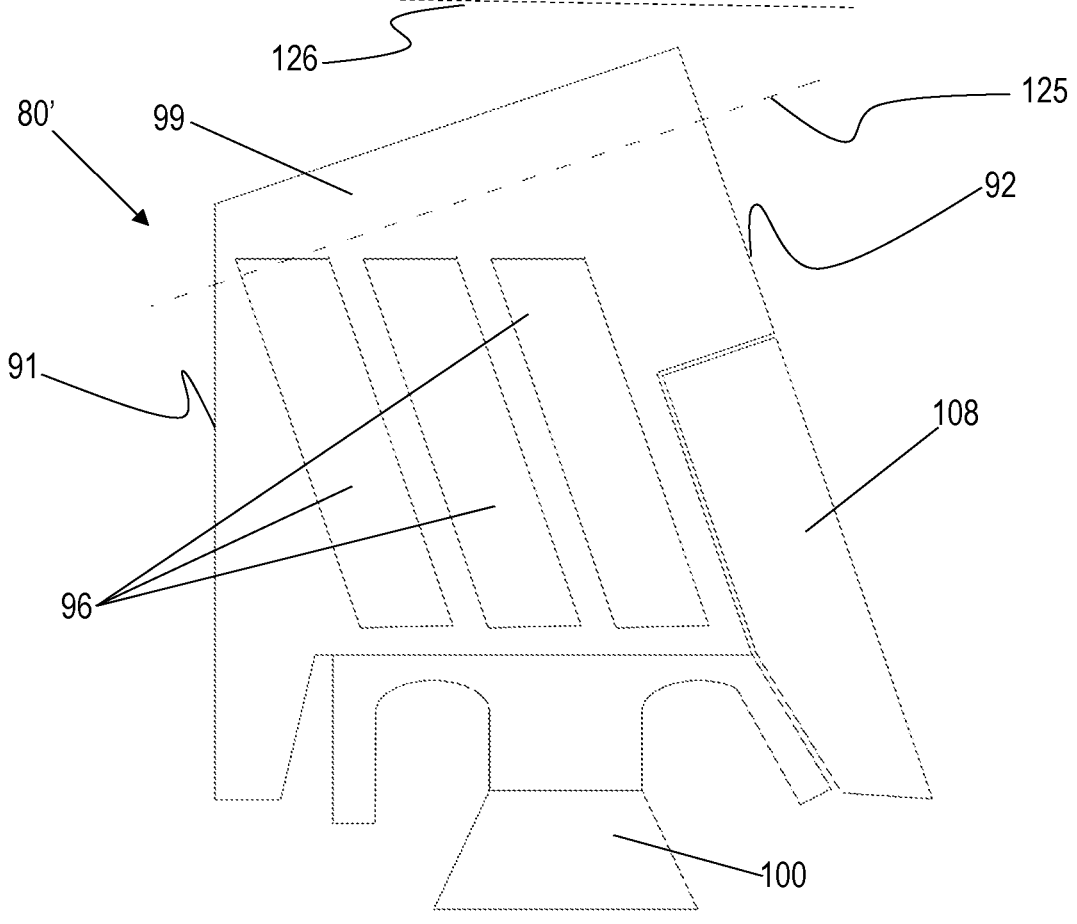
FIG. 7 illustrates an alternative embodiment of a rasp bar according to the invention.

Another alternative is illustrated in FIG. 7, that shows a top view of a rasp bar 80' with a pivotable rasp bar body 99 and a non-pivotable tooth 108, but now the pivot axis 125 of the rasp bar body is perpendicular to the slanted sidewall 92 of the rasp bar body 99. The grooves 96 and the tooth 108 are now essentially perpendicular to the pivot axis 125 and thereby slanted relative to the rotor's longitudinal direction, illustrated by the line 126. This slanted position of the grooves 96 is in fact the more common orientation of these grooves in prior art threshing rotors, like the one illustrated in FIG. 2. In the embodiment of FIGS. 3 and 4, the grooves 96 are oriented perpendicularly to the central axis of the pivot pin 107, but could also be slanted relative to this axis. However, the orientation of these grooves 96 and even the question of whether or not such grooves 96 are provided on the rasp bar body 99 is not essential in the definition of the scope of the present invention.

It is also seen in the embodiment of FIG. 7 that the tooth 108 is placed at the side of the rasp bar body 99, i.e. it is not protruding through a slit through the rasp bar body. Such a lateral placement of the tooth 108 could also be applied in the embodiment wherein the rasp bar body 99 or the tooth itself is pivotable about an axis that is parallel to the rotor's central axis (as in FIGS. 3 and 4). Also, the embodiment of FIG. 7 could be realised with a slit having sidewalls on both sides of the tooth 108 rather than with the lateral placement of the tooth 108.

In general, the invention is related to a rasp bar that comprises a primary and a secondary crop engaging portion wherein one of said portions is movable and the other is immobile relative to the rotor surface and wherein the crop engaging function of the secondary portion is either eliminated or reduced as a function of the position of the movable portion. The precise shape of these portions may differ according to various embodiments. The primary portion, for example the rasp bar body 99, may have a shape that is similar to existing rasp bars, such as the convex grooved shape illustrated in the drawings, or any other shape of an element that engages the crops as they enter the space between the rotor surface and the concave. In other words, regardless of whether or not the primary portion is movable, it will always engage with the crops. The secondary portion, for example the portion 103 comprising the tooth 108, only engages with the crops when the movable portion is in a particular position.

It is clear therefore that other variants of the invention can be easily imagined by the skilled person. The shape of the tooth could for example be different, more narrow or more broad compared to the embodiment shown, or placed at a different location relative to the rasp bar body. A more general definition of a crop engaging feature like the tooth 108 is that it is an extension that is more narrow than the crop engaging surface 95 of the rasp bar body 99, as seen in the direction of the rotor's central axis 89. Instead of the tooth 108 shown in the drawings, the crop engaging feature could have a round shape, such as a spike or a tine.

The invention is also not limited to embodiments involving a movable crop engaging portion that is pivotable. According to other embodiments, one of the crop engaging portions of the rasp bar could be movable by translation instead of by rotation. For example, a movable tooth could be coupled to an actuator inside the rotor 40, that pushes the tooth as a whole outward or pulls the tooth inward relative to an immobile rasp bar body.

According to embodiments of the invention, the movable crop engaging portion may be movable only when the rotor is not operational, for example by providing a positioning bolt that enables changing the position of the movable portion and fixing it at a desired position. In this way, the crop engaging action of the secondary crop engaging portion, for example the portion comprising the tooth 108, can be set and fixed in accordance with a given crop type or harvesting condition.

The invention is not limited to rotors of the axial flow type. Rasp bars in accordance with the invention are also applicable on a rotor configured to be mounted transversely to harvester's longitudinal direction.

A rotor of the invention may be a combined threshing and separation rotor as described above. A rotor of the invention may also be a rotor that is only configured for threshing or a rotor that is only configured for separating.

The invention is related also to any type of harvesting implement equipped with a rotor that is provided with one or more rasp bars in accordance with the invention.

The invention claimed is:

1. A rotor for an agricultural implement for processing harvested crops, the rotor rotates about a central longitudinal axis, the rotor comprising:
   a cylindrical surface;
   a plurality of rasp bars mounted on the cylindrical surface for processing a layer of crop between the rotor and a concave of the agricultural implement, at least one of the rasp bars comprising a primary crop engaging portion and a secondary crop engaging portion, wherein:
   the secondary crop engaging portion is immobile relative to the rotor surface,
   the primary crop engaging portion is movable relative to the rotor surface and relative to the secondary crop engaging portion such that a distance between at least part of the primary crop engaging portion and the rotor surface is variable,
   the secondary crop engaging portion comprises a crop engaging feature that extends radially outwardly from the primary crop engaging portion or that lies at a same radial position or radially inwardly of the primary crop engaging portion, depending on a position of the primary crop engaging portion, that enables a crop engagement function of the crop engaging feature of the secondary crop engaging portion is fully or partially activated or fully deactivated as a function of the relative position of the primary crop engaging portion; and
   an actuator mechanism that actuates movement of the primary crop engaging portion relative to the secondary crop engaging portion.

2. The rotor according to claim 1, wherein the primary crop engaging portion is a rasp bar body having a convex crop-engaging surface and wherein the crop engaging feature is an extension of the secondary crop engaging portion that is narrower, in a direction of the central longitudinal axis of the rotor, than the convex crop-engaging surface of the rasp bar body.

3. The rotor according to claim 2, wherein the extension comprises a crop engaging front wall that is oriented perpendicularly with respect to the convex crop-engaging surface of the rasp bar body when the extension extends radially outwardly from the rasp bar body.

4. The rotor according to claim 2, wherein the rasp bar body comprises a slit with parallel sidewalls, and wherein the extension equally has parallel sidewalls so as to fit between the sidewalls of the slit.

5. The rotor according to claim 1, wherein the crop engaging feature of the secondary crop engaging portion is a tooth, a spike, or a tine that increases traction exerted by the at least one rasp bar on crop moving between the rotor as it rotates about the central longitudinal axis and the concave, when the crop engaging part of the secondary crop engaging portion extends radially outwardly from the primary crop engaging portion.

6. The rotor according to claim 1, wherein the primary crop engaging portion is pivotable relative to the cylindrical surface of the rotor.

7. The rotor according to claim 6, wherein the primary crop engaging portion is pivotable about a pivot axis that is parallel to the central longitudinal axis of the rotor.

8. The rotor according to claim 6, wherein the secondary crop engaging portion is a rasp bar body having a first sidewall, a second sidewall, and a convex crop-engaging surface lying between the first sidewall and the second sidewall, the first sidewall being perpendicular to the central longitudinal axis of the rotor and the second sidewall being slanted relative to the central longitudinal axis, and wherein the primary crop engaging portion is pivotable about an axis that is perpendicular to the slanted sidewall.

9. The rotor according to claim 1, wherein the secondary crop engaging portion and the primary crop engaging portion are self-regulating in that:
   the primary crop engaging portion is forced into an outward position by centrifugal force generated by rotation of the rotor about the central longitudinal axis,
   the primary crop engaging portion is forced inwardly by the layer of crop present between the rotor and the concave, when a density of the crop exceeds a given limit, and
   the crop engaging feature of the secondary crop engaging portion is activated when the primary crop engaging portion is forced inwardly.

10. The rotor according to claim 1, wherein the rotor is placed in an axial direction of the agricultural implement, the rotor further comprising an upstream threshing section and a downstream separation section, and wherein the downstream separation section comprises at least one of the rasp bars.

11. A method for processing crops using a rotor according to claim 1, when mounted in the agricultural implement, the method comprising:

detecting or measuring an operational condition of the crop or of the rotor;

determining, on the basis of the detected or measured operational condition, an optimal position of the primary crop engaging portion of the at least one of the rasp bars; and setting the primary crop engaging portion of the at least one of the rasp bars at the optimal position.

12. The method according to claim 11, wherein the condition is one or more of the following: moisture of the crop, grain loss, and a load on the rotor.

13. An agricultural implement comprising the rotor according to claim 1.

* * * * *